(No Model.)
J. H. STOKESBARY.
HARROW.
No. 248,231. Patented Oct. 11, 1881.
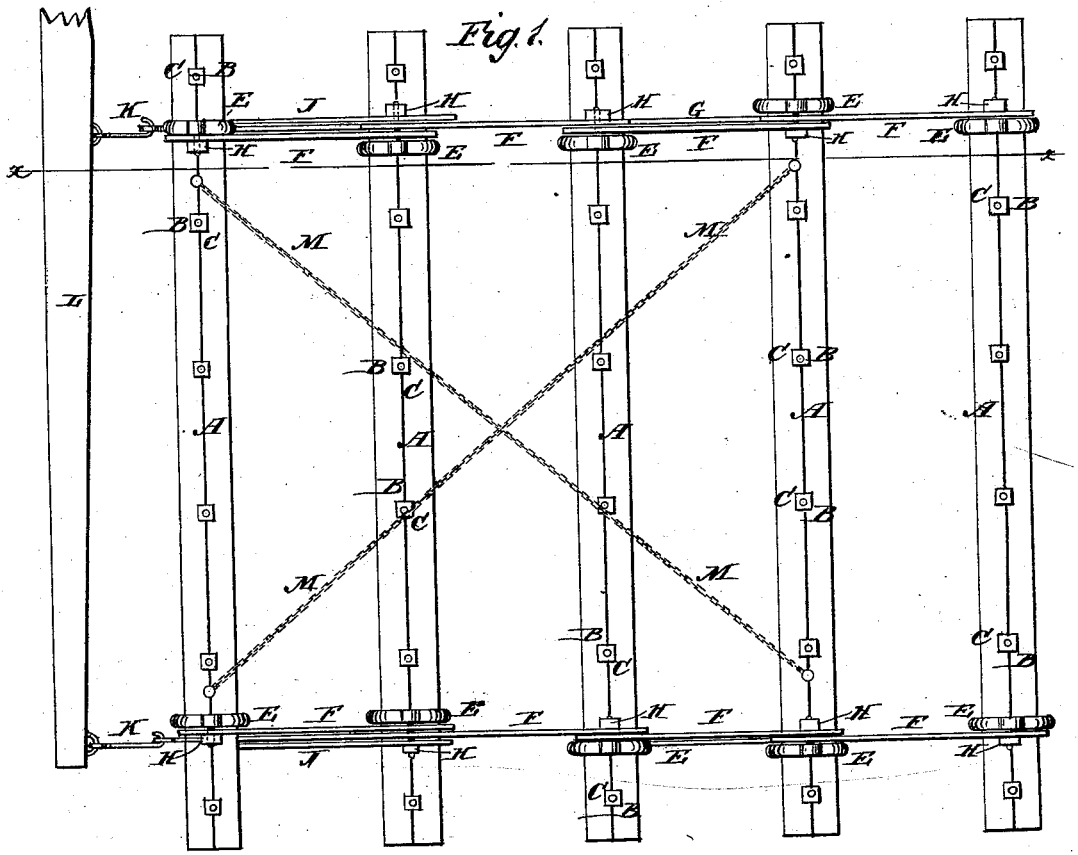
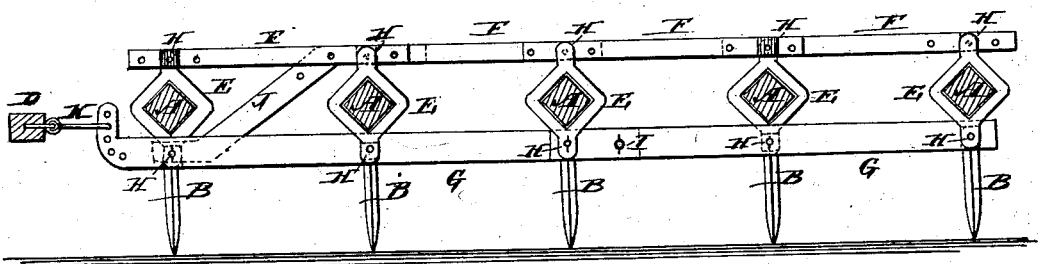
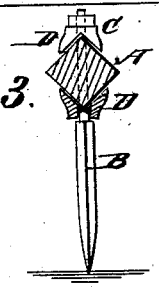
WITNESSES:
Francis McArdle
C. Sedgwick
INVENTOR:
J. H. Stokesbary
BY Munn & Co.
ATTORNEYS.
N. PETERS, Photo-Lithographer, Washington, D. C.

UNITED STATES PATENT OFFICE.

JOHN H. STOKESBARY, OF AURORA, NEBRASKA.

HARROW.

SPECIFICATION forming part of Letters Patent No. 248,231, dated October 11, 1881.

Application filed July 16, 1881. (No model.)

*To all whom it may concern:*

Be it known that I, JOHN HENRY STOKESBARY, of Aurora, in the county of Hamilton and State of Nebraska, have invented a new and useful Improvement in Harrows, of which the following is a specification.

Figure 1 is a plan view of my improvement. Fig. 2 is a sectional side elevation of the same, taken through the line $x\ x$, Fig. 1. Fig. 3 is a sectional elevation of one of the tooth-bars, one of the washers being shown in section.

Similar letters of reference indicate corresponding parts.

The invention consists in tooth-bars made square and perforated diagonally, combined with angular washers secured on shank of teeth between a shoulder and nut, as hereinafter described.

A represents the bars, five (more or less) of which can be used, and each of which can be provided with six (more or less) teeth, B. The bars A are made square in their cross-section, as shown in Figs. 2 and 3, and are perforated diagonally to receive the teeth-shanks.

The teeth B have shoulders at the lower ends of their shanks and screw-threads upon the upper ends of the said shanks to receive the nuts C, by means of which the said teeth are secured to the bars A. The teeth B are strengthened in position by washers D, placed upon their shanks above and below the bars A, and which are made angular or are notched to fit upon the upper and lower edges of the bars A, as shown in Fig. 3. By this construction the washers D strengthen the bars A where they are weakened by the perforations for the teeth, and prevent the said bars from being split by the side pressure of the said teeth.

To each bar A, near each end, is fitted a band or collar, E, which has lugs upon its upper and lower corners.

To the lugs of the collars E are attached, or upon them are formed, pins or bolts H, to pass through holes in the bars F G, that connect the bars A, and which are secured in place in the said bars F G by keys or nuts. The bars F are placed above the bars A, are jointed and overlapped above each bar A, and have several holes formed in their overlapped ends to receive the pins or bolts H, so that by moving the said pins or bolts from one to another of the holes in the overlapped ends of the said bars F any or all of the bars A can be adjusted to bring their teeth B to a vertical position, or to give them a forward or a rearward inclination, as may be desired, or as the character of the work to be done may require.

The bars G are placed beneath the bars A, and are jointed and overlapped at the center of the harrow-section, as shown in Fig. 2, to make the harrow flexible and adapt it to adjust itself to the surface of the ground.

A second set of holes can be formed in the overlapped ends of the bars G to receive a bolt or pin, I, when it is desired to make the harrow rigid.

The bars A are locked in place with the teeth B in any desired position by the inclined bars J, the lower ends of which are secured to the lower pins or bolts H of the forward bar A, and their upper ends are secured to the upper pins or bolts H of the second bar A, as shown in Fig. 2. Several holes are formed in the ends of the bars J to receive the pins or bolts H, so that the bars A can be locked in any desired position. With this construction, by adjusting the bars J all the bars A can be adjusted at the same time.

The forward ends of the forward bars G are bent upward and have a number of holes formed in them to receive the rods, links, or chains K, by which the harrow is connected with the draw-bar L, so that the point of draft attachment can be adjusted as may be required.

The harrow-frame is strengthened against lateral strain by the diagonal brace-chains M, attached to the bars A, as shown in Fig. 1.

I have described the harrow as being formed of a single section, but it may be formed of two or more sections, if desired.

Having thus fully described my invention, I claim as new and desire to secure by Letters Patent—

In harrows, the tooth-bars A, made square and perforated diagonally, in combination with the angular washers D D, secured on teeth against the bars by a nut at top and against a shoulder on shank below the bar, as shown and described.

JOHN HENRY STOKESBARY.

Witnesses:
WM. P. HOLLINGS,
M. MUNGER.